US011269813B2

(12) United States Patent
Toews et al.

(10) Patent No.: US 11,269,813 B2
(45) Date of Patent: *Mar. 8, 2022

(54) STORING TEMPORARY STATE DATA IN SEPARATE CONTAINERS

(71) Applicant: Microsoft Technology Licensing, LLC, Redmond, WA (US)

(72) Inventors: John Hartley Toews, Seattle, WA (US); Jacob Richard Pitts, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

This patent is subject to a terminal disclaimer.

(21) Appl. No.: 16/429,424

(22) Filed: Jun. 3, 2019

(65) Prior Publication Data

US 2019/0354512 A1 Nov. 21, 2019

Related U.S. Application Data

(63) Continuation of application No. 14/690,663, filed on Apr. 20, 2015, now Pat. No. 10,346,365, which is a continuation of application No. 12/766,681, filed on Apr. 23, 2010, now Pat. No. 9,015,136, which is a continuation-in-part of application No. 12/692,210, filed on Jan. 22, 2010, now abandoned.

(51) Int. Cl.
*G06F 16/176* (2019.01)
*G06F 16/958* (2019.01)
*G06F 16/951* (2019.01)

(52) U.S. Cl.
CPC ........ *G06F 16/1774* (2019.01); *G06F 16/951* (2019.01); *G06F 16/972* (2019.01)

(58) Field of Classification Search
CPC ... G06F 16/1774; G06F 16/951; G06F 16/972
USPC ......................................... 707/704
See application file for complete search history.

(56) References Cited

U.S. PATENT DOCUMENTS 6,711,618 B1 * 3/2004 Danner ............... H04L 67/34
709/228
6,748,420 B1 * 6/2004 Quatrano ............. G06F 16/954
709/205

(Continued)

OTHER PUBLICATIONS

Microsoft document, "Temporary State Service Protocol Specification", Microsoft Corporation, Nov. 5, 2009, 23 pages. (Year: 2009).*

*Primary Examiner* — Phuong Thao Cao
(74) *Attorney, Agent, or Firm* — NovoTechIP International PLLC (57) ABSTRACT

A temporary state service protocol is utilized by clients to temporarily store and access data within rows of a database between different requests made by end users. Each client creates and manages one or more items for storing data in rows of the database independently from other clients. An Application Programming Interface (API) is used to create and interact with the data that is temporarily stored in items within rows of the database. Different clients may share data within a single item and the data may persist beyond a session ending. Different rows of the database may be related such that a procedure affecting one of the rows affects its related rows.

23 Claims, 4 Drawing Sheets

(56) References Cited

U.S. PATENT DOCUMENTS

| | | | | |
|---|---|---|---|---|
| 6,813,635 B1* | 11/2004 | Jorgenson | ............... | G06F 9/505 709/219 |
| 6,883,015 B1* | 4/2005 | Geen | ....................... | G10L 15/30 703/23 |
| 7,634,570 B2* | 12/2009 | Paya | ................... | G06F 16/9574 709/227 |
| 7,756,846 B2* | 7/2010 | Klein | ................... | G06F 16/2343 707/704 |
| 7,788,321 B2* | 8/2010 | Korovkin | ........... | G06F 16/9535 709/203 |
| 7,912,917 B2* | 3/2011 | Chakra | ................. | G06F 40/174 709/217 |
| 8,667,031 B2* | 3/2014 | Konduri | ................. | G06F 16/951 707/825 |
| 8,838,679 B2* | 9/2014 | Alev | ....................... | H04L 67/02 709/203 |
| 9,094,369 B2* | 7/2015 | Kim | ....................... | G06F 16/957 |
| 2002/0161839 A1* | 10/2002 | Colasurdo | ........... | H04L 67/2819 709/204 |
| 2002/0184507 A1* | 12/2002 | Makower | ................. | H04L 63/12 713/182 |
| 2003/0105805 A1* | 6/2003 | Jorgenson | ........... | H04L 67/1095 709/203 |
| 2003/0110266 A1* | 6/2003 | Rollins | ................. | H04L 67/142 709/227 |
| 2004/0085366 A1* | 5/2004 | Foster | ................... | H04L 67/142 715/854 |
| 2004/0133563 A1* | 7/2004 | Harvey | ................... | H04L 67/02 |
| 2004/0181598 A1* | 9/2004 | Paya | ................... | G06F 16/9574 709/227 |
| 2006/0031382 A1* | 2/2006 | Pradhakar | ........... | G06F 16/9566 709/217 |
| 2006/0031442 A1* | 2/2006 | Ashley | ................... | H04L 67/02 709/223 |
| 2008/0052778 A1* | 2/2008 | Narusawa | ............. | H04L 9/3231 726/19 |
| 2008/0059584 A1* | 3/2008 | Lam | ................... | G06F 16/9562 709/205 |
| 2008/0104255 A1* | 5/2008 | Volodarsky | ............. | H04L 67/14 709/228 |
| 2009/0172565 A1* | 7/2009 | Jackson | ................ | H04L 65/403 715/753 |
| 2009/0264202 A1* | 10/2009 | Chen | ....................... | A63F 13/79 463/42 |
| 2010/0185930 A1* | 7/2010 | Scott | ....................... | G06F 9/54 715/222 |
| 2011/0184924 A1* | 7/2011 | Toews | ................... | G06F 16/951 707/704 |
| 2011/0185134 A1* | 7/2011 | Toews | ................... | G06F 16/9574 711/158 |

* cited by examiner

STORING TEMPORARY STATE DATA IN SEPARATE CONTAINERS

RELATED APPLICATIONS

The present application is a continuation of U.S. patent application Ser. No. 14/690,663, filed Apr. 20, 2015, now issued U.S. Pat. No. 10,346,365; which is a continuation of U.S. patent application Ser. No. 12/766,681, filed Apr. 23, 2010, now issued U.S. Pat. No. 9,015,136; which is a continuation-in-part of U.S. patent application Ser. No. 12/692,210, filed Jan. 22, 2010, which is incorporated by reference and claims the benefit of the earlier filing date under 35 U.S.C. § 120. To the extent appropriate, a claim of priority is made to each of the above disclosed applications.

BACKGROUND

The HyperText Transport Protocol (HTTP) is a stateless protocol that is used to request and serve web resources, such as web pages, graphics, and the like over the Internet. Each request is serviced as it arrives from a client and after the request is processed the data relating to the request is discarded. As such, no state information is maintained across requests even from the same client. It is useful, however, to maintain information across requests for certain solutions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A temporary state service protocol is utilized by clients to temporarily store and access data within rows of a database between different requests made by end users. Each client creates and manages one or more items for storing data in rows of the database independently from other clients. An Application Programming Interface (API) is used to create and interact with the data that is temporarily stored in items within rows of the database. Different clients may share data within a single item and the data may persist beyond a session ending. Different rows of the database may be related such that a procedure affecting one of the rows affects its related rows.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
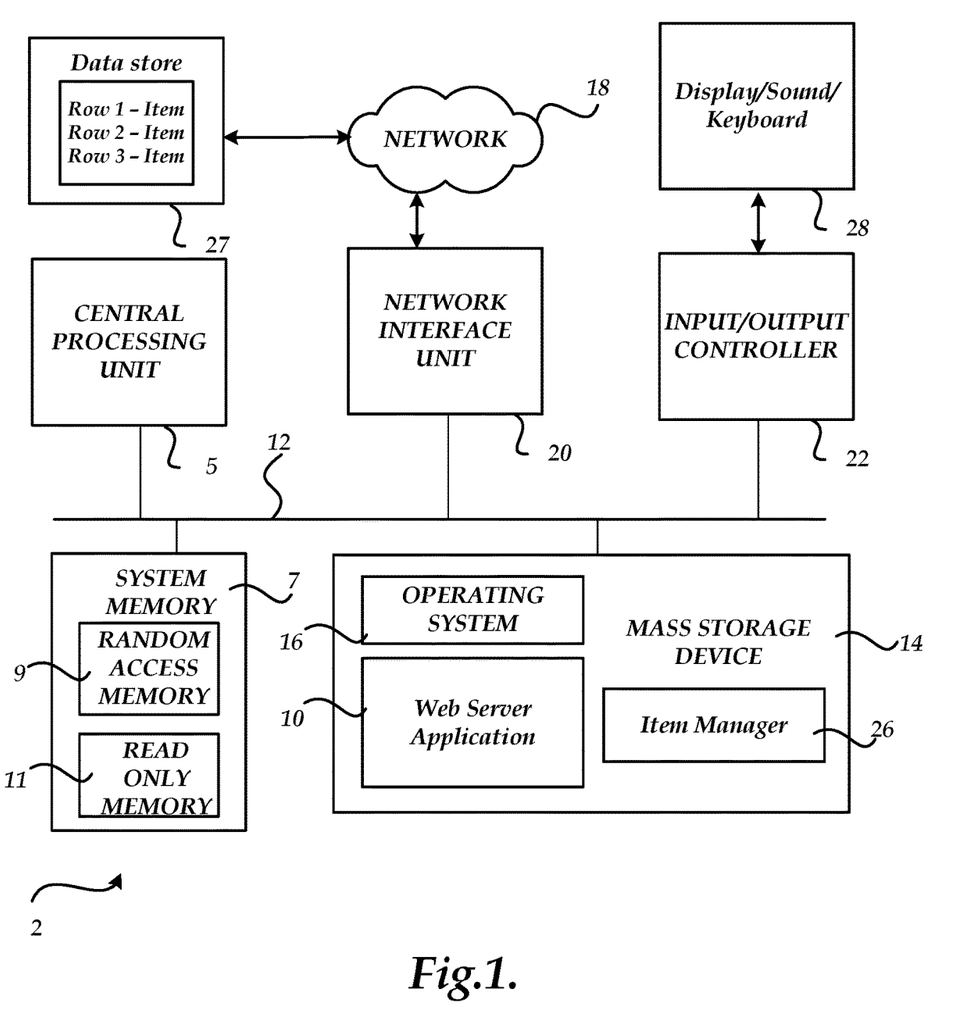
FIG. 1 illustrates an exemplary computing environment.

Referring now to FIG. 1, an exemplary computer architecture for a computer 2 utilized in various embodiments will be described. The computer architecture shown in FIG. 1 may be configured in many different ways. For example, the computer may be configured as a web server, a personal computer, a mobile computer and the like. As shown, computer 2 includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 operates in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems.

The computer 2 may also include an input/output controller 22 for receiving and processing input from a number of devices, such as: a keyboard, mouse, electronic stylus and the like (28). Similarly, the input/output controller 22 may provide output to a display screen, a printer, or some other type of device (28).

As mentioned briefly above, a number of program modules and data files may be stored in the mass storage device 14 and RAM 9 of the computer 2, including an operating system 16 suitable for controlling the operation of a networked computer, such as: the WINDOWS 7®, WINDOWS SERVER®, WINDOWS SHAREPOINT SERVER®, operating systems from MICROSOFT CORPORATION; UNIX; LINUX and the like. The mass storage device 14 and RAM 9 may also store one or more program modules. In particular, the mass storage device 14 and the RAM 9 may store a web server application program 10. According to one embodiment, the web server application 10 is a content management application, such as MICROSOFT CORPORATION'S SHAREPOINT 2010®. The web server application program 10 is operative to provide functionality for receiving requests from clients and processing the requests.

Typically, web server application 10 receives a request from a end user's browser application on a client computing device. A WWW browser, such as Microsoft's INTERNET EXPLORER®, is a software browser application program that may be used in requesting the data. Upon receiving the request from the user via the browser on a separate computing device, the web server application 10 retrieves the desired data from the appropriate data server. Generally, a request occurs over HTTP and includes one or more identifiers (ID) for one or more clients. HTTP is a higher-level protocol than TCP/IP and is designed for the requirements of the Web and is used to carry requests from a browser to a Web server and to transport pages from Web servers back to the requesting browser or client. Item manager 26 is used to temporarily store data in a location within a database, such as data store 27, between requests such that data needed by a client is not lost between requests. Data store 27 is configured to store data within items for a number of clients. According to one embodiment, each item is stored within a separate row of a database. Each client manages its own items within the rows of data store 27 independently from the other clients.

Generally, item manager 26 uses a temporary state service protocol that provides an API to clients to create, store and interact with data that is temporarily stored within items in data store 27. Instead of each client that is associated with a web page having to share and store data within a single item for the web page, each client that is associated with the web page can store data in one or more different items within the rows of the database in data store that are each maintained separately. For example, a first client can store data in a first item within a first row (i.e. Row 1), whereas a second client that is associated with the same page can store data in a second item within a second row (i.e. Row 2). Different clients may also interact with data in different rows when they are provided with the unique identifier for the item that is stored in a different row. For example, a first client may provide the second client with the identifier of the first row such that the second client can perform actions on the data within the first row that was created by the first client. Each client can create items that are uniquely identified for storing data. When the clients retrieve items from the data store, clients can optionally request that a virtual lock be placed on the item to ensure exclusive access for the requesting client. The procedures associated with the protocol are directed at enabling clients to create, add, modify, retrieve, and delete items in a data store, such as data store 27. According to one embodiment, procedures are directed at enabling clients to access items with virtual locks and to remove virtual locks from instances of the item. Generally, when a client intends to modify data in an item, the client requests exclusive access to the item by requesting a lock on the item. The client receives an indication, such as a lock cookie identifying that a virtual lock is placed on the item. Once a client has completed working with an item of the data, the client can store the updated item in the data store and release the virtual lock identified by the lock cookie, thereby allowing other clients to access the item. If no changes were made to an item of the data, clients can release the virtual lock without making any modifications to the item in the data store. In some instances, a virtual lock held on an item will be considered stale after a period of time. In these situations, a client can forcibly remove the virtual lock from the item and/or the lock can be automatically removed. According to one embodiment, items within each row of the database within the data store are set to expire after a predetermined amount of time. For example, clients may set the expiration time and/or some other authorized user may set the expiration time. Using the API, clients can modify the expiration time for an item of the data in the data store without modifying the data itself. Clients can also remove an item of the data or all items of expired data from the data store. Additional details regarding the operation of the item manager 26 and the temporary state service protocol used to interact with the data within the rows of the database will be provided below.

Figure 2:
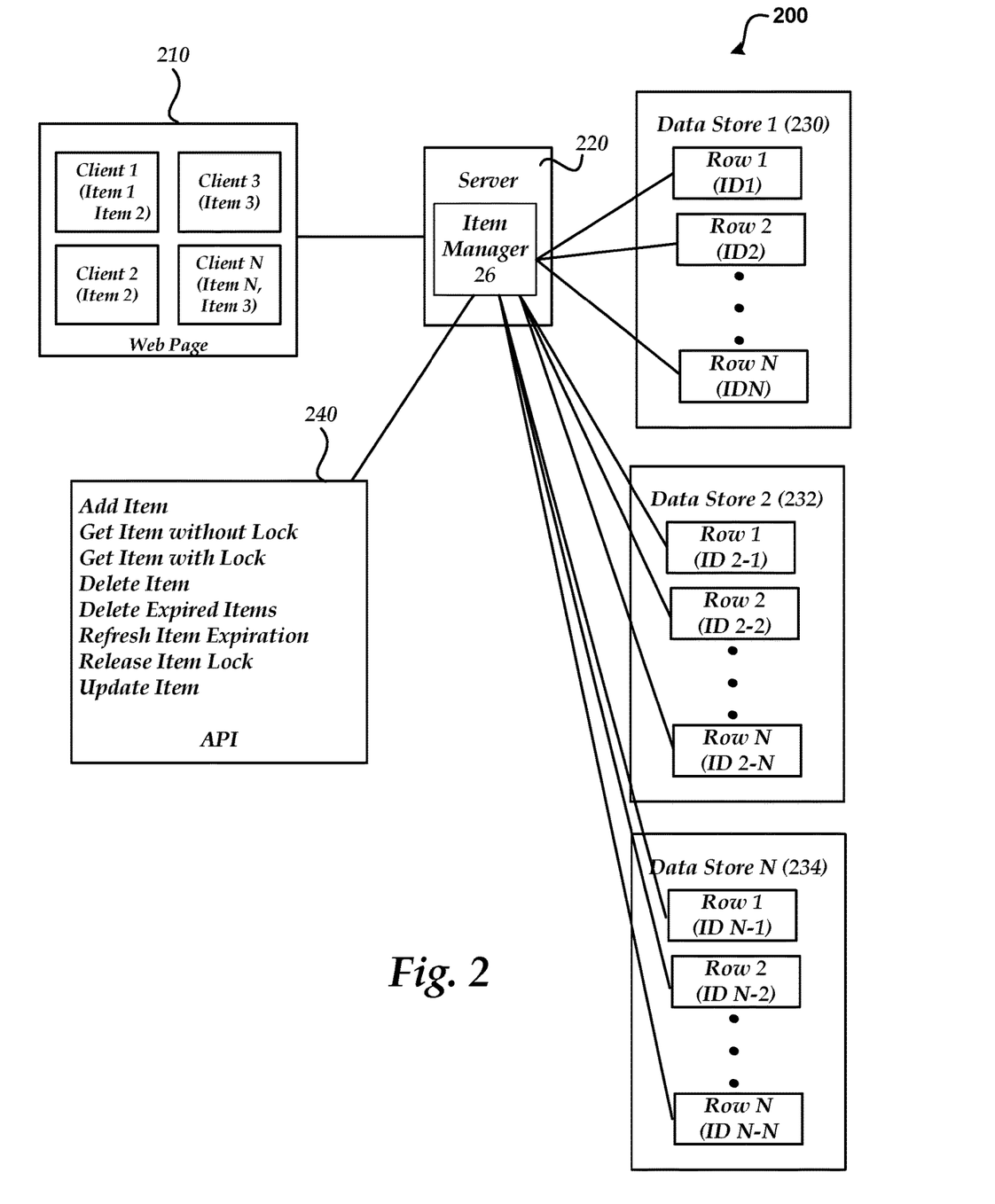
FIG. 2 shows a system having multiple clients that utilize a temporary service state protocol for independently managing and interacting with items temporarily stored in a data store.

FIG. 2 shows a system having multiple clients that utilize a temporary service state protocol for managing and independently interacting with items temporarily stored in a data store. As illustrated, system 200 includes web page 210 that is associated with multiple clients, such as clients 1-N. Each of the clients illustrated stores data temporarily in data store 230 and/or data store 232 between requests made to server 220. As briefly discussed above, item manager 26 is configured to provide a way for each client to interact with data that it has stored within an item within a row of a database (i.e. Rows 1-N), such as one or more of the items 1-N. As illustrated, client 1 is associated with Item 1 having an identifier of ID1; client 2 is associated with Item 2 having an identifier of ID2-2; client 3 is associated with Item 3 having an identifier of ID2-1; and client N is associated with two items (Item N having an identifier of IDN and Item 1).

Each item that is stored within a row of the database may be related to another item(s) (row(s)) within the same database and/or a different database that is stored on the same computing device or another computing device. For example, a parent item (i.e. a document) may include one or more child items that represents objects embedded within the document. As illustrated within web page 210, Item 1 is related to Item 2 and Item N is related to Item 3. Generally, when an item is related to another item, an action to an item also affects the related dependent item(s). For example, deleting a parent item (i.e. Item 1) deletes any children (i.e. Item 2) of that item. Different actions may be configured based on the application. For example, different actions may be configured based on a level of the relationship (i.e. parent to child, child to child, level to same level, level to another level, and the like).

Items for storing the temporary data may also be stored on one or more databases across one or more computing devices. Different allocation schemes may also be used. For example, each database may store an equal portion of the load, a non-equal portion of the load (i.e. 70% of load to data store 1, 30% to data store 2), each database may be associated with one or more applications, and the like. A user may configure the allocation schemes. Databases may also be added or paused on a live server. For instance, a database may be added during an existing session and/or data within items on one database may be migrated to another database.

Instead of each client receiving data that it is not interested in, each client utilizes API 240 to manage its own data that is to be temporarily stored. The procedures for API 240 that are associated with the temporary state service protocol are directed at allowing the clients to add items to the data store, modify data within the items, retrieve data from the items, and delete data from items in the data store. The clients may also use the API to place and remove virtual locks when accessing data within the items as well as modify expiration times of the items.

According to one embodiment, the procedures that are supported by API 240 include the following: an Add Item procedure; Get Item without Lock procedure; Get Item with Lock procedure; Delete Item procedure; Delete Expired Items procedure; Refresh Item Expiration procedure; Release Item Lock procedure; and an Update Item procedure.

The Add Item procedure is used by the clients to create a new item and row in data store 230 and insert data specified by the client calling the add item procedure into the item specified by the client into the data store.

The Get Item without Lock procedure retrieves data from the specified item in the data store without placing a virtual lock on the data. Placing a lock on an item in the data store prevents other clients from changing the data while the client that has placed the item in a lock interacts with the data. The Get Item without Lock procedure allows a client to view the data in the item but not modify the data.

The Get Item with Lock procedure retrieves data from the specified item the data store and attempts to place a virtual lock on the item for exclusive access by the requesting client. When the item is locked, only the client that placed the lock can modify the data.

The Delete Item procedure deletes an item of data from the data store. According to one embodiment, the Delete Item procedure deletes the item and any related items that are considered children of the item.

The Delete Expired Items procedure deletes the expired items of data from the data store. According to one embodiment, an item expires after a predetermined period of time such that storage is not tied up for longer then needed within data store 230. The timeout can be set to many different values. For example, the expiration period may be ten minutes, thirty minutes, one hour, twenty four hours, and the like. According to one embodiment, each client determines an expiration time for each item that it has created. For instance, one client on web page 210 may need data in item 1 for fifteen minutes whereas another client, or the same client, on the web page may need data in another item for twenty four hours. According to one embodiment, calling the delete expired items procedure removes all of the expired items from the data store regardless of the client that created the item. The delete expired items procedure may be called by a client and/or automatically called at predetermined times.

The Refresh Item Expiration procedure updates the expiration time of an item of data in the data store. For example, a client may need to store the data longer then it first calculated. According to one embodiment, the refresh period is the same as a first indicated expiration time. According to another embodiment, the refresh period may be set to a different expiration time period.

The Release Item Lock procedure removes a virtual lock from an item of data such that other clients can access the item if needed.

The Update Item procedure updates an item of data in the data store.

The following are exemplary signatures of the procedures.

PROCEDURE AddItem (@id varchar(512), @item varbinary(max), @timeout int); where @id: The procedure associates the data in the data store with the supplied identifier. @id is not NULL. Data associated with the same @id does not already exist in the data store. @item: The data that is to be stored. The procedure does not place a virtual lock on the stored data. @timeout: A positive integer value in minutes indicating the time-out of the data. Return Values: An integer which is 0.

PROCEDURE GetItemWithoutLock (@id varchar(512), @item varbinary(max) OUTPUT, @locked bit OUTPUT, @lockAgeInSeconds int OUTPUT, @lockCookie int OUTPUT); where @id: The procedure attempts to retrieve data associated with the supplied identifier. @item: The value passed into the procedure in this parameter is ignored. If no data exists for the identifier supplied in the @id variable, a NULL value is returned. If the data identified by the @id variable does not have a virtual lock on it, the procedure returns the data in the @item output parameter. Otherwise a NULL value is returned in the @item output parameter. @locked: The value passed into the procedure in this parameter is ignored. If no data exists for the identifier supplied in the @id variable, a NULL value is returned. If the data identified by the @id variable does not have a virtual lock on it, a 0 is returned in the @locked output parameter. Otherwise a 1 is returned in the @locked output parameter. @lockAgeInSeconds: The value passed into the procedure in this parameter is ignored. If no data exists for the identifier supplied in the @id variable, a NULL value is returned. If the data identified by the @id variable does not have a virtual lock on it, the value returned in the @lockAgeInSeconds output parameter is 0. Otherwise @lockAgeInSeconds is not NULL, and the procedure returns the lock age in seconds of the data in the @lockAgeInSeconds output parameter. @lockCookie: The value passed into the procedure in this parameter is ignored. If no data exists for the identifier supplied in the @id variable, a NULL value is returned. If the data identified by the @id variable does not have a virtual lock on it, the value returned in the @lockCookie output parameter is ignored by the protocol client. Otherwise, the procedure returns the lock cookie currently associated with the virtual lock in the @lockCookie output parameter which is not NULL. Return Values: An integer which is 0.

PROCEDURE GetItemWithLock (@id varchar(512), @item varbinary(max) OUTPUT, @locked bit OUTPUT, @lockAgeInSeconds int OUTPUT, @lockCookie int OUTPUT); where @id: the procedure attempts to retrieve data associated with the supplied identifier. @item: the value passed into the procedure in this parameter is ignored. If no data exists for the identifier supplied in the @id variable, a NULL value is returned. If the data identified by the @id variable does not have a virtual lock on it, the procedure returns the data in the @item output parameter. Otherwise a NULL value is returned in the @item output parameter. @locked: The value passed into the procedure in this parameter is ignored. If no data exists for the identifier supplied in the @id variable, a NULL value is returned. If the data identified by the @id variable does not have a virtual lock on it, the value 0 is returned in the @locked output parameter, and the procedure places a virtual lock on the data. Otherwise, the value 1 is returned in the @locked output parameter. @lockAgeInSeconds: The value passed into the procedure in this parameter is ignored. If no data exists for the identifier supplied in the @id variable, a NULL value is returned. If the data identified by the @id variable does not have a virtual lock on it, the value returned in the @lockAgeInSeconds output parameter is 0. Otherwise, the procedure returns the lock age in seconds of the data's virtual lock in the @lockAgeInSeconds output parameter which is not NULL. @lockCookie: The value passed into the procedure in this parameter is ignored. If no data exists for the identifier supplied in the @id variable, a NULL value is returned. Otherwise, the procedure returns the lock cookie associated with the virtual lock in the @lockCookie output parameter which is not NULL. Return Values: An integer which is 0.

PROCEDURE DeleteExpiredItems ( ) attempts to delete all of the expired items in the data store; Return Values: An integer which is 0.

PROCEDURE DeleteItem (@id varchar(512), @lockCookie int); deletes a specified item within the data store where @id: The identifier of data to remove. @lockCookie: The lock cookie of the data to remove. Return Values: An integer which is 0.

PROCEDURE RefreshItemExpiration (@id varchar (512)); where @id: The procedure updates the expiration time of the data associated with the supplied identifier. If no data exists for the identifier supplied in the @id variable, the procedure does not make any changes. Return Values: An integer which is 0.

PROCEDURE ReleaseItemLock (@id varchar(512), @lockCookie int); where @id: The procedure removes the virtual lock from the data associated with the supplied identifier. If no data exists for the identifier supplied in the @id variable, the procedure does not make any changes. @lockCookie: If the value supplied in this parameter matches the lock cookie currently associated with the instance of data, the procedure removes the virtual lock from the data, and it updates the expiration time of the data. Otherwise, the procedure does not remove the virtual lock and does update the expiration time. Return Values: An integer which is 0.

PROCEDURE UpdateItem (@id varchar(512), @item varbinary(max), @timeout int, @lockCookie int); where @id: The procedure updates the data in the data store associated with the supplied identifier. If no data exists for the identifier supplied in the @id variable, the procedure does not make any changes. @item: The new data that is to be stored if the lock cookie supplied in the @lockCookie parameter matches the lock cookie currently associated with the instance of data. Additionally, the procedure does not remove the virtual lock from the data. @timeout: A value in minutes indicating the lifetime of the supplied data. If the lock cookie supplied in the @lockCookie parameter matches the lock cookie currently associated with the item of data, the procedure updates the expiration time associated with the instance of data. @lockCookie: The procedure updates the data in the data store if the lock cookie supplied in the @lockCookie parameter matches the lock cookie currently associated with the instance of data. If this parameter does not match the lock cookie currently associated with the instance of data, the procedure does not make any changes. Return Values: An integer which is 0.

Figure 3:
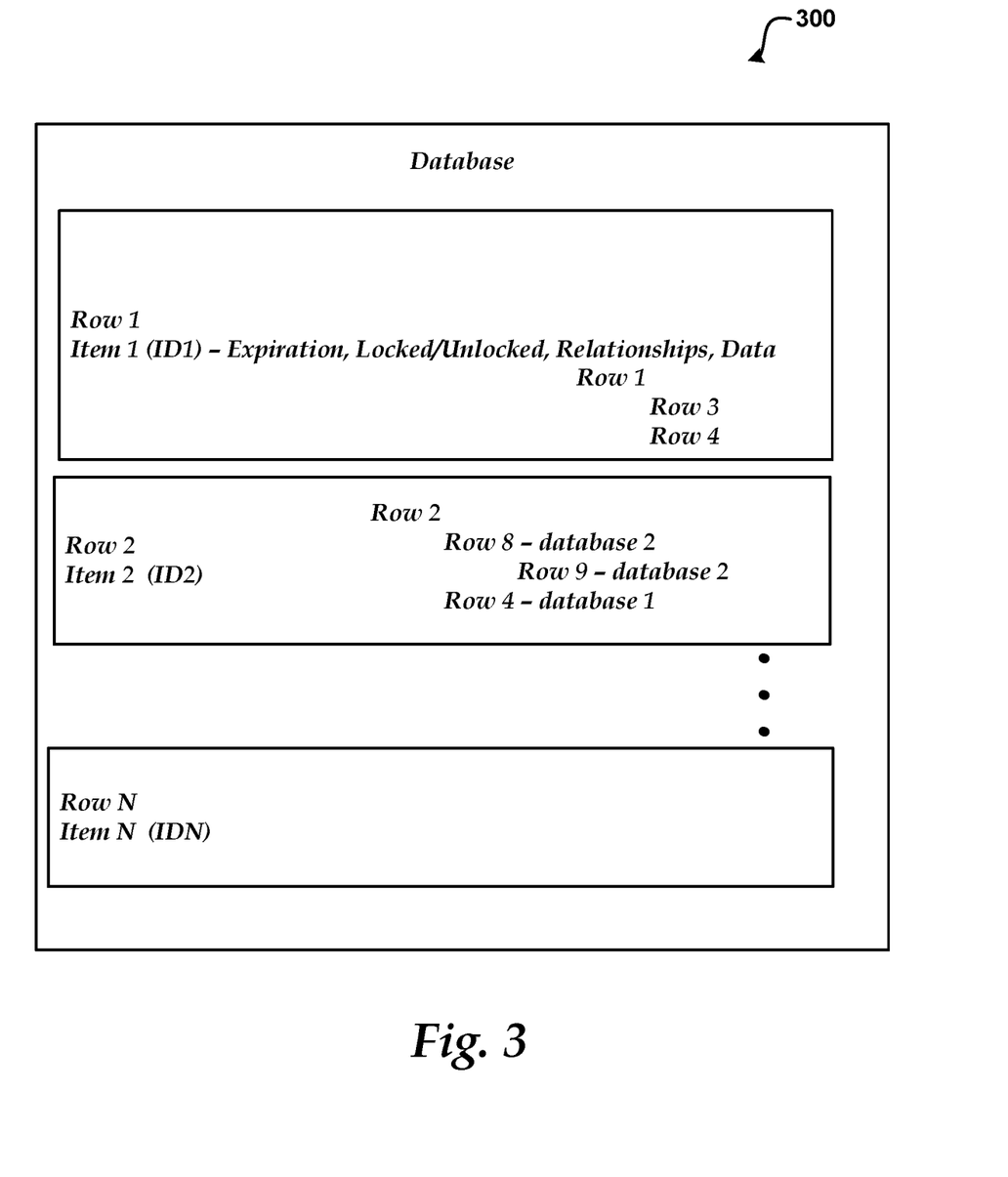
FIG. 3 shows an example database having N items that are stored in N rows of the database.

FIG. 3 shows an example database 300 having N items that are stored in N rows of the database. Each row within the database is associated with a different item that is managed by a client. According to one embodiment, each item is identified by a unique identifier and includes information relating to the management of the item such as: an expiration time for the data, whether the data is locked/unlocked, any relationships for the row, and the data itself. Other data relating to the item may also be stored within the row of the database. As illustrated, Row 1 specifies that Row 3 and Row 4 are children to Row 1. Row 2 specifies that Row 8 is a child of Row 2 that is stored in a different database (database 2), Row 9 is a child of Row 8 (also stored in database 2) and Row 4 is a child of Row 2 that is stored in the same database as Row 2.

Figure 4:
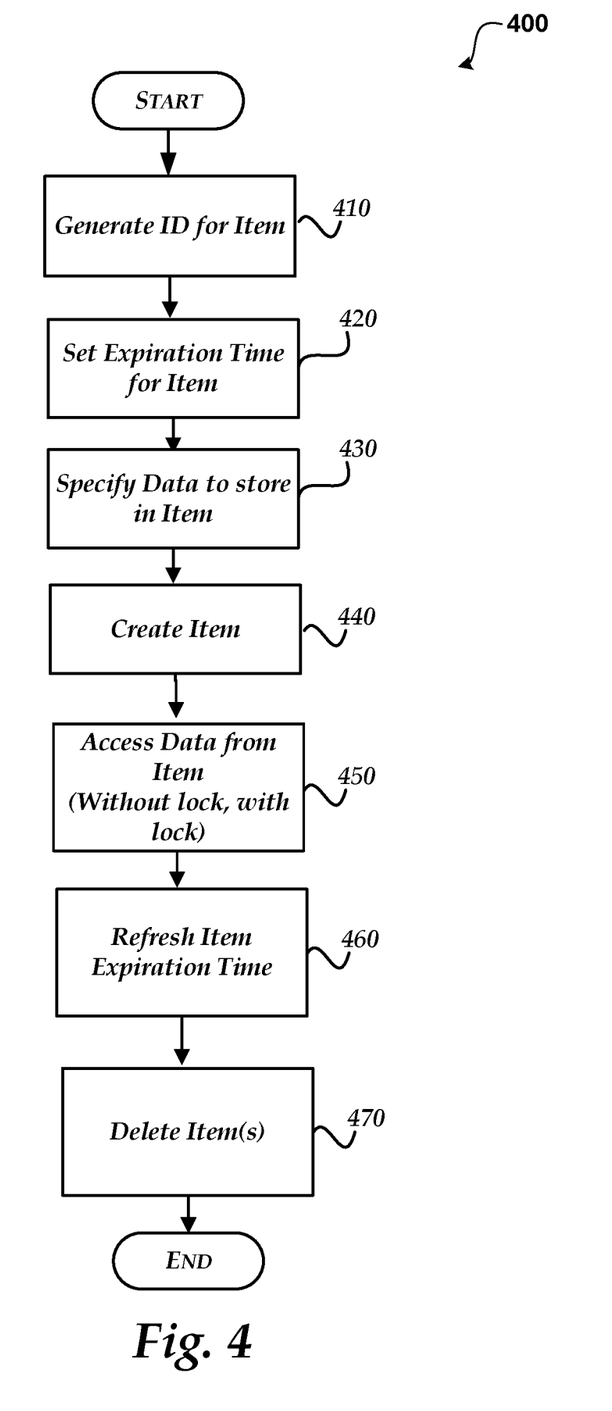
FIG. 4 shows an illustrative process for using the temporary service state protocol to store data within rows of a database.

Referring now to FIG. 4 an illustrative process for using the temporary service state protocol to store data within rows of a database will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Referring now to FIG. 4, after a start operation, the process flows to operation 410, where an identifier for a new item to be created is determined. The identifier may be created by the client or on a different computing device. According to one embodiment, the client asks the API to generate the unique identifier for the item and uses the identifier when creating the item. The identifier uniquely identifies the item within one of the rows across different databases. For example, each row of one or more databases that stores an item is assigned a unique identifier.

Moving to operation 420, an expiration time for the item is specified. The expiration time specifies a time period that is used to determine how long the item is to be maintained in a row of the data store. According to one embodiment, the client creating the item specifies a timeout value from which the expiration time is calculated. Each item may have a different expiration time. For example, one item may expire after ten minutes whereas another item expires after two hours. According to one embodiment, any related items are set to the same expiration time.

Moving to operation 430, the data to store in the item is specified. The data may be any type of data that is to be temporarily stored.

Transitioning to operation 440, the data specified by the client is stored within a row of a database that is identified by the ID for the item. According to one embodiment, the items may be distributed across different databases that use an allocation scheme that specifies how to store the items. For example, one database may store 10% of the items whereas another database may store 55% and a third database may store 35% of the item. As discussed above, any allocation scheme may be used.

Moving to operation 450, a client requests to access the data based on the unique identifier. A client may read the data and/or update the data. According to one embodiment, a client may access the data with a lock such that the while the lock is in place, the client is the only client that is authorized to update the data within the item. The client may also access the data without a lock in which case the client is authorized to read the data but not make any updates to the data. Different clients may also collaborate on the same data within an item within a row of the database when each of the collaborating clients are provided with the unique identifier of the row of the database. This may allow multiple users to collaborate on the same shared data, allow multiple browsers or applications on a user's desktop to collaborate on the same data, and the like.

Flowing to operation 460, a client may refresh the expiration time of an item. For example, a client may want to store the data in the item for a longer period of time then was initially set. According to one embodiment, when a parent item is refreshed, any children items of the item are also refreshed. The expiration time may be set to last longer then a web session. For example, the temporary state data may be stored longer then a current user's web session. In this way, the data that is associated with each of the clients in a previous web session may be used in a new web session as long as the data has not expired.

Moving to operation 470, a client may use the API to delete a single item within the data store and/or delete every expired item within the data store. According to one embodiment, when a parent item is deleted, any children items of the item are also deleted.

The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
providing, by a temporary state service protocol, an application programming interface (API) associated with a web page comprising an object representing data associated with the web page, wherein the data is stored in an item identified by a unique identifier and associated with an expiration time specifying an amount of time the item is to be maintained, wherein a first client manages the data stored in the item independently from a second client associated with the web page using the temporary state service protocol and the unique identifier;
receiving, from the second client, a request to access the item, the request comprising the unique identifier; and
using the unique identifier in the request to enable the second client to access the item managed by the first client.

2. The method of claim 1, further comprising:
receiving, from the first client, an initial request;
based on the initial request, retrieving the data from a data source; and
storing the data in the item.

3. The method of claim 1, wherein the item is stored in a database associated with the webpage.

4. The method of claim 3, wherein the unique identifier identifies the item within a row of the database.

5. The method of claim 1, wherein the expiration time is configured to extend beyond a single web session.

6. The method of claim 1, wherein a virtual lock is placed on the item when the item as accessed by the first client or the second client.

7. The method of claim 1, wherein the second client uses the API to modify the expiration time for the item without modifying the data.

8. The method of claim 1, wherein the unique identifier enables a first user of the first client to collaborate on the item with a second user of the second client.

9. The method of claim 1, wherein the item is associated with one or more children items stored in a database, wherein removing the item from the database removes the one or more children items from the database.

10. The method of claim 1, further comprising:
in response to using the unique identifier in the request, presenting, to the second client, at least a portion of the data stored in the item; and
receiving, from the second client, an instruction associated with at least one of the data or the item.

11. The method of claim 1, wherein the first client provides the unique identifier to the second client.

12. A system comprising:
at least one processor; and
memory coupled to the at least one processor, the memory comprising computer executable instructions that, when executed by the at least one processor, performs a method comprising:
providing, by a temporary state service protocol, an application programming interface (API) associated with a web page, wherein the web page comprises data that is stored in an item identified by a unique identifier and associated with an expiration time specifying an amount of time the item is to be maintained, wherein a first client manages the data stored in the item independently from a second client associated with the web page using the temporary state service protocol and the unique identifier;
receiving, from the second client, a request to access the item, the request comprising the unique identifier; and
using the unique identifier in the request, accessing, by the second client, the item managed by the first client.

13. The system of claim 12, wherein the web page comprises an embedded object representing the item.

14. The system of claim 12, wherein the unique identifier is generated by the API when the item is created.

15. The system of claim 12, wherein the item was created by the first client during a first web session and the second client accesses the item during a second web session.

16. The system of claim 12, wherein the item is stored in a row of a database according to an allocation scheme of the temporary state service protocol.

17. The system of claim 12, wherein the temporary state service protocol is used to temporarily store and access data within rows of a database between different requests made by one or more clients.

18. The system of claim 12, wherein accessing the item managed by the first client enables the second client to collaborate on the item.

19. The system of claim 12, wherein the API enables the first client and the second client to access the item simultaneously using the unique identifier.

20. The system of claim 12, wherein, when the expiration time is reached, access to the item is revoked for at least one of the first client and the second client.

21. The system of claim 12, wherein the first client provides the unique identifier to the second client.

22. A computer-readable storage device having computer-executable instructions which when executed performs a method comprising:
- providing, by a temporary state service protocol, an application programming interface (API) associated with a web page comprising an object representing data associated with the web page, wherein the data is stored in an item identified by a unique identifier and associated with an expiration time specifying an amount of time the item is to be maintained, wherein a first client manages the data stored in the item independently from a second client associated with the web page using the temporary state service protocol and the unique identifier;
- receiving, from the second client, a request to access the item, the request comprising the unique identifier; and
- using the unique identifier in the request to enable the second client to access the item managed by the first client.

23. The computer-readable storage device of claim 22, wherein the first client provides the unique identifier to the second client.

* * * * *